United States Patent [19]

Weiler et al.

[11] Patent Number: 4,891,171
[45] Date of Patent: Jan. 2, 1990

[54] HUMIDIFIER CONTAINER

[75] Inventors: Gerhard H. Weiler, South Barrington; Henry Komendowski, Des Plaines, both of Ill.

[73] Assignee: Automatic Liquid Packaging, Inc., Woodstock, Ill.

[21] Appl. No.: 221,935

[22] Filed: Jul. 20, 1988

Related U.S. Application Data

[62] Division of Ser. No. 909,191, Sep. 19, 1986, abandoned.

[51] Int. Cl.$^4$ .............................................. B01F 3/04
[52] U.S. Cl. ................................................... 261/124
[58] Field of Search ....................................... 261/124

[56] References Cited

U.S. PATENT DOCUMENTS

| | | | |
|---|---|---|---|
| 3,606,985 | 9/1971 | Reed | 261/124 |
| 3,807,713 | 4/1974 | Cornett, III et al. | 261/122 |
| 3,903,216 | 9/1975 | Allan et al. | 261/DIG. 65 |
| 3,926,810 | 12/1975 | Gudernatsch et al. | 261/124 |
| 4,012,471 | 3/1977 | Kunkle, Jr. | 261/124 |
| 4,054,622 | 10/1977 | Lester | 261/124 |
| 4,100,235 | 7/1978 | Thornwald | 261/124 |
| 4,187,951 | 2/1980 | Cambio, Jr. | 261/124 |
| 4,367,182 | 1/1983 | Kienholz | 261/124 |

Primary Examiner—Tim Miles
Attorney, Agent, or Firm—Dressler, Goldsmith, Shore, Sutker & Milnamow, Ltd.

[57] ABSTRACT

A hermetically sealed unitary liquid container of a thermoplastic material suitable for use in inhalation therapy is disclosed. The humidifier container comprises a body portion defined by an upstanding walled chamber having a bottom, a gas inlet duct unitary with the container body portion and defining a sealed gas inlet, and a sealed humidified gas outlet duct, both unitary with the container body portion. The container body portion constitutes a liquid reservoir and contains a predetermined amount of an aqueous aseptic or sterile aqueous liquid for humidifying a breathable gas. The gas inlet duct extends alongside the walled chamber, and has upper and lower end portions which are respectively situated above the container body portion and below usable liquid level in the container. The gas outlet duct communicates with the walled chamber above the usable liquid level. The gas inlet duct communicates with a gas diffuser defined by the container wall above the container bottom. The gas diffuser causes gas bubbles entering the liquid to rise through the liquid away from the container wall. The sealed gas inlet and the sealed gas outlet are provided with removable closures that can be broken off or twisted off.

9 Claims, 3 Drawing Sheets

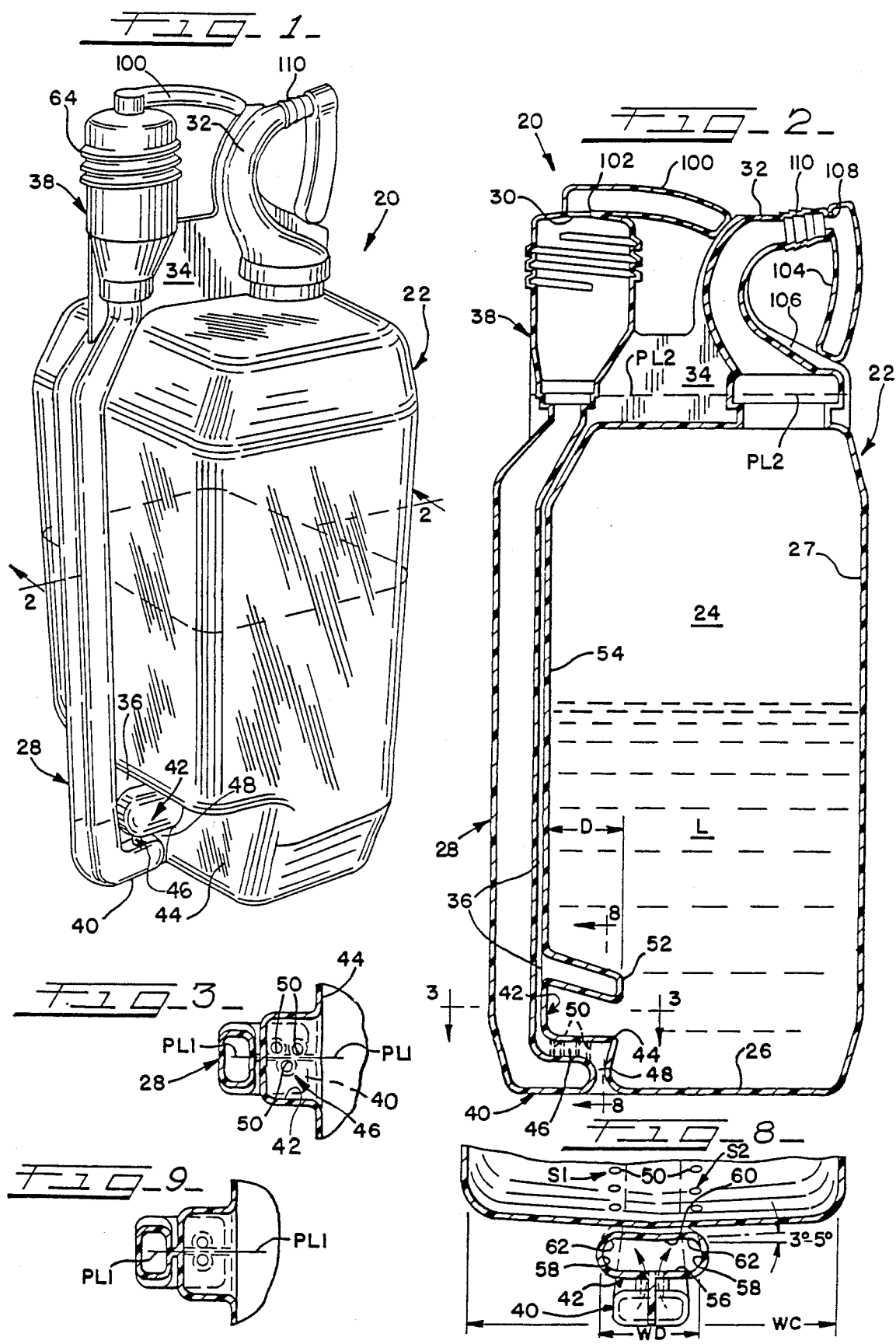

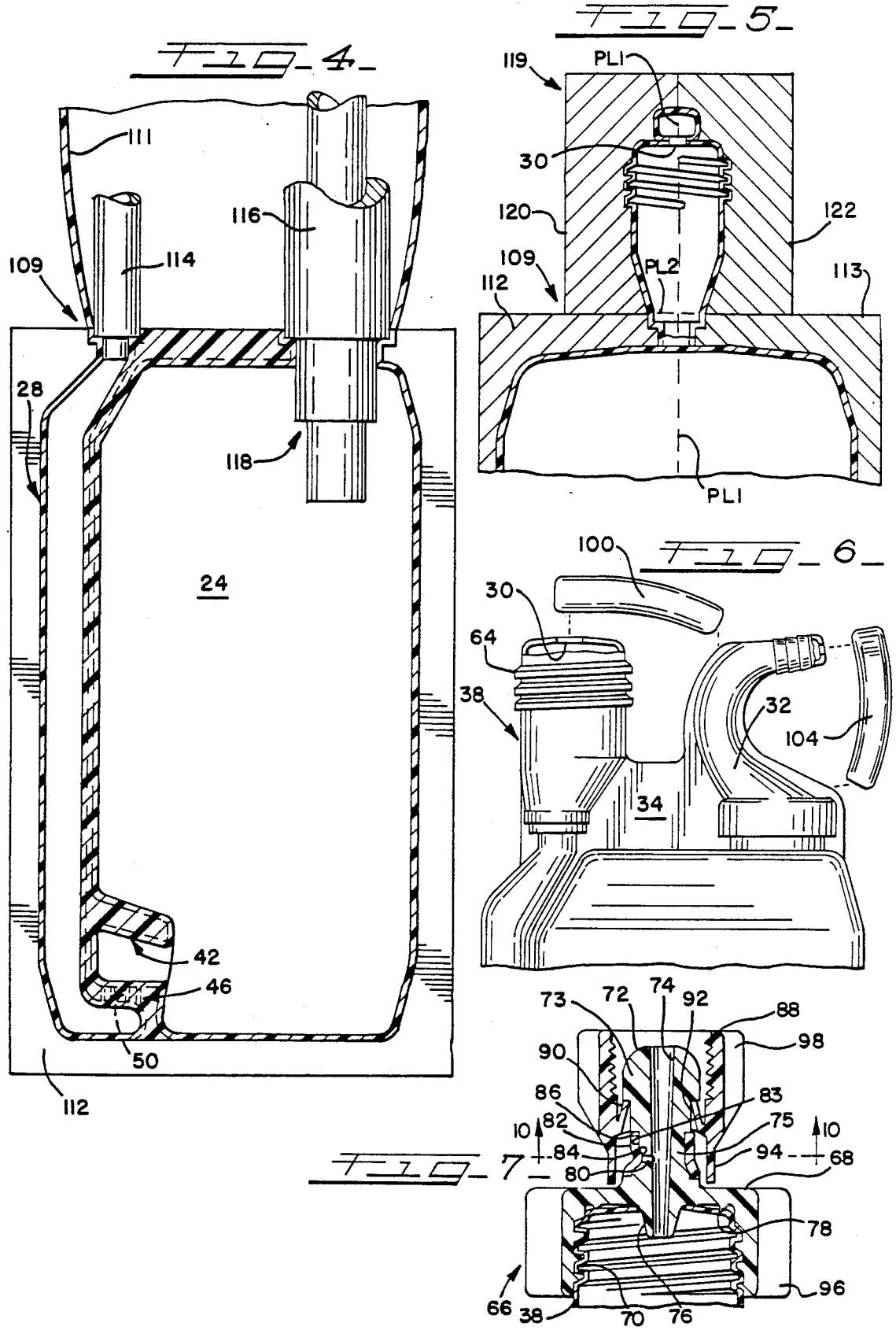

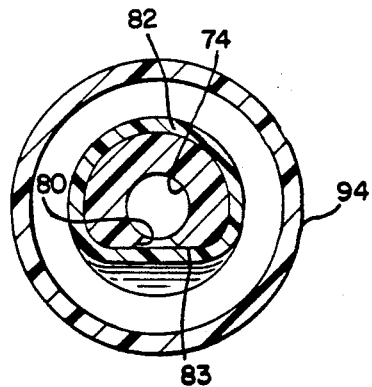
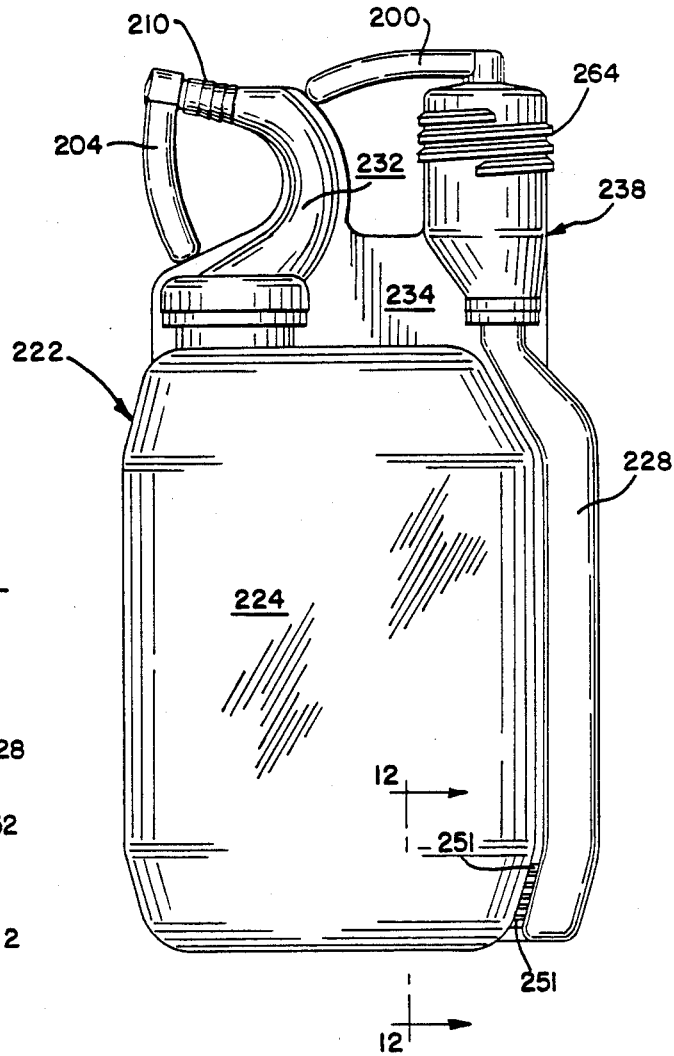
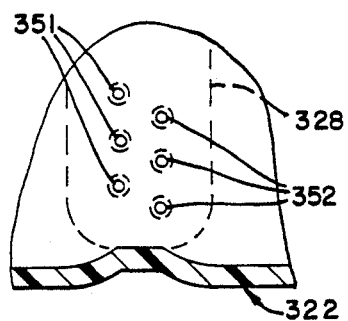
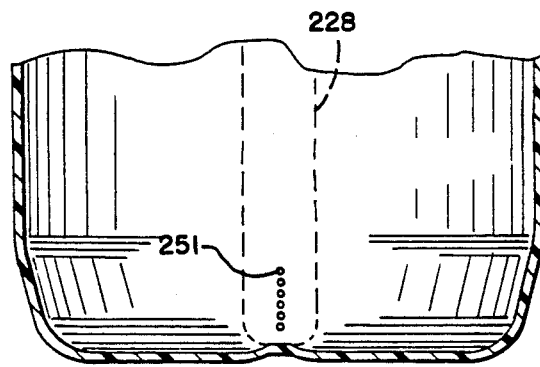
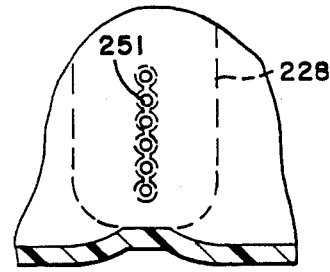

HUMIDIFIER CONTAINER

TECHNICAL FIELD OF THE INVENTION

The present invention is generally related to the art of inhalation therapy. In particular, the present invention is directed to a humidifier container suitable for use in inhalation therapy. Still more particularly, the present invention is directed to a humidifier container of the gas-bubbler type, hermetically sealed and containing an aseptic or sterile aqueous liquid, typically sterile water.

BACKGROUND OF THE INVENTION

Inhalation therapy is the art of treating a patient with a breathable gas (such as air, oxygen, oxygen-enriched air) with moisture added thereto. Inhalation therapy devices include gas-bubbler devices and nebulizers for that purpose. The moisture can be provided by bubbling the breathable gas through a body of water or by atomizing or nebulizing water particles and thereafter combining such water particles with the breathable gas. Either method results in humidification of the breathable gas.

It is known to blow mold hermetically sealed liquid containers of the gas-bubbler type, containing acetic or sterile aqueous liquids, typically sterile water, for use in inhalation therapy. For example, each of U.S. Pat. No. Re. 27,155 to Hansen and U.S. Pat. No. 4,176,153 to Weiler et al. disclose an apparatus for making such a container. Each of U.S. Pat. Nos. 3,807,713 to Cornett et al.; 3,903,216 to Allan et al.; and 4,187,951 to Cambio discloses a container of this general type. U.S. Pat. No. 4,217,328 to Cambio discloses the method of making the container described in the aforementioned U.S. Pat. No. 4,187,951 to Cambio.

Conventional gas-bubbler type humidifier containers typically include at the bottom thereof a gas-diffuser device for passing the breathable gas through the liquid contained therein. One problem with conventional humidifier containers of the gas-bubbler type is that an audible bubbling sound can be heard as the gas passes through the liquid in the container. To many an inhalation therapy patient such a bubbling sound is unpleasant and can even be disturbing. Also, in conventional humidifier containers bubbles tend to stick to the container wall and tend to grow in size undesirably before rising through the liquid.

Such large gas bubbles not only tend to erupt more violently when breaking the liquid surface than small gas bubbles, but are known to be less efficient for gas humidification purposes.

SUMMARY OF THE INVENTION

The present invention is directed to a humidifier container of the gas-bubbler type which is suitable for use in inhalation therapy and is relatively silent in operation. The humidifier container is provided with a unique access means that is occluded by a readily removable closure means and with an unique gas diffuser situated in the container sidewall. The closure means is of a break-off or twist-off type and provides a convenient access to the container without the need to drive a cannula or spike into the container, thereby obviating the likelihood of introducing particulate solid matter and potential contamination within the container. The gas diffuser portion of the present invention causes gas bubbles entering the liquid contained within the container to be split into at least two separate gas bubble streams which rise relatively silently through the contained liquid and away from the container wall.

The humidifier container of the present invention is a hermetically sealed unitary liquid container of a thermoplastic material. The humidifier container comprises a body portion defined by an upstanding, walled chamber having a bottom and a sidewall, a gas-inlet duct along the container body portion and defining a sealed gas inlet, and a sealed humidified-gas outlet duct, both ducts being unitary with the container. The container body portion constitutes a liquid reservoir and contains a predetermined amount of an aqueous aseptic or sterile liquid therein, such as sterile water. The gas inlet duct extends alongside the walled chamber, has upper and lower end portions respectively situated above and below usable liquid level in the container, and supplies gas to be humidified to the liquid reservoir from a side thereof. The gas outlet duct communicates with the walled chamber above the usable liquid level.

In one embodiment of the invention, the gas inlet duct communicates with a plenum that is situated below the usable liquid level in the container at one side of the container. The plenum, in turn, communicates with the walled chamber near but above the container bottom. The plenum, which functions as a gas bubble diffuser, is defined by the sidewall, spaced beneath and offset from a substantially vertically disposed container wall portion, thereby enabling gas bubbles entering the liquid via the plenum to rise through the liquid but away from the container wall. Adherence of gas bubbles to the container wall is thereby avoided.

In another embodiment, the gas diffuser provides a series of apertures built into the container sidewall defining the container body portion and injects plural streams of gas bubbles into the liquid reservoir above the container bottom and having a lateral velocity component. Again adherence of gas bubbles to the container wall is avoided.

BRIEF DESCRIPTION OF THE DRAWINGS

FIG. 1 is a perspective view of the humidifier container of the present invention;

FIG. 2 is an elevational sectional view, taken along the plane 2—2 in FIG. 1 and on an enlarged scale relative thereto;

FIG. 3 is a fragmentary horizontal sectional view, taken along the plane 3—3 in FIG. 2;

FIG. 4 is a vertical sectional view of a lower portion of the humidifier container of the present invention within the forming mold thereof;

FIG. 5 is a fragmentary vertical sectional view of an upper portion of the humidifier container of the present invention within the respective forming molds thereof;

FIG. 6 is a partial fragmentary and exploded side view, showing the upper portion of the humidifier container with portions cut away to show interior detail;

FIG. 7 is a partial elevational view of a section of a signal coupling threadedly engageable with the humidifier container of the present invention, shown on an enlarged scale relative to FIGS. 1–6;

FIG. 8 is a vertical sectional view, taken along the plane 8—8 in FIG. 2;

FIG. 9 is an alternative embodiment of a detail shown in FIG. 3;

FIG. 10 is a sectional view taken along plane 10—10 in FIG. 7;

FIG. 11 is an elevational view of a container illustrating another embodiment of the present invention;

FIG. 12 is a fragmentary sectional view taken along plane 12—12 in FIG. 11;

FIG. 13 is an enlarged view of the gas diffuser portion visible in FIG. 12; and

FIG. 14 is a view similar to that of FIG. 13 but showing yet another embodiment of the present invention.

DETAILED DESCRIPTION OF PREFERRED EMBODIMENT

While the present invention is susceptible to embodiment in various forms, there is shown in the drawings and hereinafter described in detail a presently preferred embodiment of the invention. The present disclosure is to be considered as an exemplification of the invention without limitation to the specific embodiments illustrated.

Referring initially to FIGS. 1 and 2, a humidifier container or bottle 20 embodying the principles of the present invention is shown. Container 20 is suitable for use in combination with conventional inhalation therapy apparatus (not shown). Container 20 can be constructed by molding a suitable thermoplastic material such as polyethylene, polypropylene, or the like, and contains an aseptic or sterile aqueous liquid L, such as water.

Such a container can be formed as described in U.S. Pat. No. 4,176,153 to Weiler et al. That is, container 20 is formed from a molten tube of thermoplastic material, typically called parison, which is formed to the desired shape, then filled with the desired liquid and thereafter sealed. The forming, filling and sealing steps will be discussed in somewhat greater detail below in connection with discussion of FIGS. 4 and 5.

Liquid container 20 comprises a body portion 22 defining an upstanding walled chamber 24 (FIG. 2) and having a bottom or base 26 joined to sidewall 27, a gas inlet duct 28 that terminates at the upper end thereof in a sealed gas inlet 30, and a sealed humidified gas outlet duct 32. The walled chamber 24 constitutes a reservoir for aqueous liquid L and contains a predetermined amount thereof.

The gas inlet duct 28 extends alongside the walled chamber 24 and is joined with the body portion 22 via webbings 34 and 36 that are unitary with body portion 22 as well as inlet duct 28. At its upper end, gas inlet duct 28 terminates in an externally threaded male inlet coupling 38 for attachment to a suitable breathable gas source when the container is in use. At its lower end, gas inlet duct 28 terminates in a lower end portion 40 that communicates with chamber 24.

Inlet coupling 38, in turn, defines gas inlet 30 that is occluded by removable tab 100 joined to inlet coupling 38 by a frangible web 102 that is unitary with tab 100, as well as inlet coupling 38, and that surrounds gas inlet 30. When container 20 is readied for use, gas inlet 30 is opened by breaking or twisting off tab 100. Such action exposes gas inlet 30 without the need to drive a spike or cannula into container 20. As a result, the likelihood of introducing particulate matter or contamination into the container is substantially reduced.

To couple container 20 to a breathable gas source, inlet coupling 38 is provided with appropriate external threads adapted to receive a cap-like, threaded female coupling.

Inlet coupling 38 is situated above the body portion of container 20 and lower end portion 40 of gas inlet duct is situated below usable liquid level in container 20. More specifically, lower end portion 40 communicates with plenum 42, defined by container sidewall 27, through channels 50 in manifold 46. Plenum 42, in turn, communicates with the walled chamber 24 near the container bottom 26 through 9 plenum aperture defined in lower wall portion 44. As the breathable gas is passed through duct 28, gas bubbles are first formed in plenum 42 and then dispersed through the liquid contained in chamber 24.

Gas outlet duct 32 is situated above the usable liquid level in container 20 and usually also above the body portion of container 20. Duct 32 communicates with chamber 24 and is occluded by a removable closure associated with tab 104. The distal end of gas outlet duct 32 is provided with external serrations 110 that are adapted to receive and retain thereon flexible tubing leading to the inhalation therapy patient. The removable closure for duct 32 is unitary therewith and is connected thereto by means of a frangible web that can be severed by breaking or twisting tab 104 when it is desired to open duct 32. Upper webbing 34 is unitary with container body portion 22, gas inlet coupling 38 and gas outlet duct 32. Tabs 100 and 104 can be hollow or solid, as desired.

The lower end portion 40 of gas inlet duct 28, which includes gas manifold 46 (FIGS. 2 and 3), is also unitary with body portion 22 via lower webbing 48. The gas manifold 46 provides communication between gas inlet duct 28 and plenum 42 and for that purpose defines a plurality of spaced-apart gas channels 50 which are positioned on either side of parting line PL1 (FIG. 3). Channels 50 can be spaced from one another in a staggered fashion as shown in FIG. 3 or can be spaced in an opposed fashion relative to the parting line PL1 as shown in FIG. 9. Channels 50 can also be arranged in a single line, if desired. Each channel 50 is preferably about 1 to about 3 millimeters in diameter, and in any event is sized so as to cause a stream of gas bubbles to be introduced into liquid L.

Lower wall portion 44 (FIG. 1) in which plenum 42 is defined is substantially vertically disposed when container 20 is in its normal upright position and is offset from substantially vertically-disposed upper wall portion 54 (FIG. 2) by a predetermined distance D. A portion of lower wall 44 also defines a lip 52 (FIG. 2) which projects into chamber 24. Wall 54 is offset from the lip 52 by an amount sufficient to cause a stream of rising gas bubbles that exit from the plenum 42 to be spaced from wall 54 by the above-mentioned predetermined distance D. For a container having a liquid capacity of about one liter the distance D can be about 20 millimeters.

The plenum 42 functions as a gas bubble diffuser or distributor. Gas bubbles formed within plenum 42 are broken up into several streams. For example, as shown in FIG. 8, a first upwardly rising gas bubble stream $S_1$ is spaced from a second upwardly rising gas bubble stream $S_2$ as both gas bubble streams $S_1$ and $S_2$ are introduced into the aqueous liquid L from plenum 42.

To that end, the liquid container body portion surrounding plenum 42 defines a container width $W_C$. The plenum side surfaces 58 define plenum width $W_D$. Preferably, the ratio of $W_c$ to $W_D$ is in the range of about 10 to about 4. More preferably, the ratio is about 7. Plenum upper surface 60, also unitary with liquid container 20, preferably is convex and includes a pair of opposed end portions 62 that merge with side surfaces 58. Each one of the end portions 62 preferably is disposed upwardly at a predetermined angle which is sufficient to cause gas bubbles generated in the plenum 42 to become spaced-apart and form at least two separate rising gas-bubble streams, e.g. the above-mentioned streams $S_1$ and $S_2$, that exit from plenum 42. Each such stream is directed by the convex upper surface 60 toward a respective one of the end portions 62. Preferably, each end portion 62 is disposed at an angle of about 3 to about 5 degrees relative to a line substantially parallel to parting line PL2 shown in FIG. 2.

While container 20 can be connected to a breathable gas source in any convenient manner, preferably the connection of container 20 to a breathable gas source is effected by a threaded female coupling means 66 (FIG. 7) embodying yet another feature of the present invention. More particularly, the threaded coupling means 66 provides an audible signal when back pressure in container 20 reaches a predetermined value.

Signal coupling means 66 is a three-piece assembly which comprises a cup-shaped female connector 68 having unitary internal threads 70 which mate with threads 64 of gas inlet coupling 38, and an elongated nipple 76 that can be sealingly received within gas inlet 30 (FIG. 6). Nipple 76 is unitary with female connector 68, and defines therethrough a main gas passageway 74 for introducing breathable gas from a source (not shown) into gas inlet duct 28 via gas inlet 30. Nipple 76 is provided with a tapered, generally annularly-shaped sealing surface which provides a substantially gas-tight seal with the gas inlet 30 when disposed thereinto. Female connector 68 also includes an additional, unitary annular seal 78, substantially concentric with nipple 76, which provides a second seal around the gas inlet 30 when female connector 68 is threadedly engaged with gas inlet coupling 38.

Opposite to nipple 76 on coupling means 66 is provided an upstanding protuberance 72 having a head portion 73 and a stem portion 75. Protuberance 72 defines an extension of main gas passageway 74. Head portion 73 is adapted to receive a suitable connection from a breathable gas source. Stem portion 75 additionally defines a signal gas passageway 80 between main gas passageway 74 and the outer periphery of stem portion 75, as well as a land portion 83 adjacent to and above gas passageway 80. The signal gas passageway 80 is disposed lateral to the main gas passageway 74, as shown in FIGS. 7 and 10.

A flexible, elastic sleeve 82 is positioned on the outer surface of stem portion 75 so as to occlude signal gas passageway 80 and lie contiguous with land 83. Sleeve 82 can be fabricated from natural latex rubber, silicone rubber, or like materials. When a pressure buildup is experienced within container 20 with coupling means 66 in place, gas pressure will force gas out through signal gas passageway 80, across land 83 and past sleeve 82 while generating an audible signal, e.g., a whistling sound. The radial compressive force exerted by elastic sleeve 82 determines the pressure at which the signal will be sounded. If desired, a recess 86 can be provided in stem portion 75 to retain sleeve 82 in place. Also, a contoured neck portion 84 can be provided about the exit aperture of signal gas passageway 80 so as to enhance proper nesting of the flexible sleeve 82 and to guard against inadvertent or accidental blockage.

A protective overcap 88 is provided for protuberance 72. Overcap 88 serves as a connector means to a breathable gas-metering device. Specifically, overcap 88 is provided with internal threads which mate with the gas-metering device. Overcap 88 surrounds protuberance 72 and is snap engagable therewith by means of flexible fingers or split ring 90 within the overcap. That portion of protuberance 72 which surrounds the inlet of the main gas passageway 74 is suitably radiused to provide a substantially gas-tight seal with the metering device when the overcap 88 is threadedly connected therewith. A unitary skirt 94 depends from overcap 88 and surrounds sleeved diaphragm 82 in a spaced relationship therefrom.

Circumferentially-spaced radially-disposed wings 96 and 98 can be provided for coupling means 66 and for overcap 88, respectively, for torqueing convenience. A gap or space is provided between skirt 94 and female connector 68 to provide an escape path or passageway for signal gas that is flowing out of container 20.

Yet another feature of the present invention is the securement of tabs 100 and 104 that are respectively unitary with inlet coupling 38 and gas outlet duct 32 (FIG. 2). These tabs facilitate the removal of each of the gas inlet and gas outlet closures employing a twist-off or break-off motion, or in any other convenient manner.

A premature removal of these closures is obviously undesirable. Accordingly, in a preferred embodiment of this feature, the tab or handle 100 on inlet coupling 38 is made unitary with webbing 34 at the end portion of tab 100 that is opposite the gas inlet 30. Similarly, tab or handle 104 on gas outlet duct 32 is made unitary with webbing 106 at the distal portion of tab 104. Webbings 34 and 106 are frangible, so that the associated tabs can be readily separated therefrom by a bending or twisting motion.

A method for making a container of the type described hereinabove will be discussed below.

The overall fabrication procedure is substantially the same as that described in U.S. Pat. No. Re. 27,155 to Hansen and in U.S. Pat. No. 4,425,295 to Weiler et al. The description of these two patents is incorporated herein by reference.

More specifically, semi-molten hollow tube or parison 111 is extruded or otherwise positioned into relatively movable sectional mold assembly 109 (FIG. 4) which includes first and second relatively movable mold parts 112 and 113 (FIG. 5), each having the desired contour as determined by the shape of the container to be formed, filled, and sealed. Mandrels 114 and 116, vertically disposed and vertically movable within upper parison portion 111, are each positioned into mold assembly 109 as shown in FIG. 4, and in a sealing relationship with the parison 111. A blowing gas such as air is then introduced into the parison 111 in two stages. Air is first introduced into mold assembly 109 via mandrel 114 and causes a side portion of the parison within the mold assembly 109 to form gas inlet duct 28 and forms the channels 50 in gas manifold 46. Next, the blowing gas in introduced into mold assembly 109 via mandrel 116 at a relatively higher pressure to form the remaining, main portion of the parison into walled chamber 24 and plenum 42.

The desired aseptic or sterile liquid is next introduced into chamber 24 via mandrel 116 while the chamber is vented through passageway 118 in mandrel 116. Thereafter mandrels 114 and 116 are raised above mold assembly 109. When mandrels 114 and 116 have been elevated, an upper mold assembly 119 comprising first and second upper relatively movable mold parts 120 and 122 are brought together (FIG. 5) while engaging upper parison portion 111 therebetween, thereby hermetically sealing container 20 and at the same time forming that portion of container 20 which is above the second parting line PL2 (FIGS. 2 and 5).

Another embodiment of the present invention is shown in FIGS. 11, 12 and 13 and comprises body portion 222 that defines an upstanding walled chamber 224. Gas inlet duct 228 is provided alongside chamber 224 and is unitary therewith. At its upper end, gas inlet duct 228 terminates in an externally-threaded male inlet coupling 238 that provides attachment means to a breathable gas source (not shown). At its lower end, gas inlet duct 228 terminates in a gas diffuser that is constituted by plural gas apertures 251 arranged in an upwardly extending array along the longitudinal axis of gas inlet duct 228 and the juncture of gas inlet duct 228 with chamber 224. Apertures 251 are spaced from the container bottom and from one another and can have a diameter of about 0.015 inch to about 0.03 inch, preferably about 0.015 inch to about 0.02 inch. In the embodiment shown, six apertures are present; however, the number and spacing of the apertures can vary to accommodate the desired gas flow rates.

Inlet coupling 238 defines a gas inlet that is occluded by removable tab 200 in a manner similar to that shown in FIG. 2 as described above. Removable tab 200 is joined to inlet coupling 238 by a frangible web that is unitary with both tab 200 and coupling 238.

Again in a manner similar to that shown in FIG. 2, gas outlet duct 232 is located above the usable liquid level contained in chamber 224. Duct 232 is in communication with chamber 224 and is occluded by a removable closure that includes tab 204. External serrations are provided on the distal end of humidified gas outlet duct 232 for retaining thereon one end of a flexible tubing segment. The removable closure for duct 232 is unitary therewith and is joined thereto by a frangible web that is severed when tab 204 is twisted, pulled, or similarly manipulated.

Upper webbing 234 provides a rigidifying connection between the container body portion 222, gas inlet coupling 238 and gas outlet duct 232, and is unitary therewith. A continuation of webbing 234 alongside body portion 222 and gas inlet duct 228 provides a unitary connection therebetween that also defines in part the hereinabove described gas apertures 251 as well as their associated channels of communication between duct 228 and chamber 224.

In the embodiment shown in FIG. 14, the side gas diffuser portion is constituted by plural, spaced apertures 351 and 352 disposed in a pair of substantially vertical, i.e., along the longitudinal axis of the container, rows that are spaced from one another. This particular gas diffuser portion can also be characterized as an array of gas apertures staggered across an imaginary, substantially vertical line that coincides with or is substantially parallel to the longitudinal axis of gas inlet duct 328. Gas apertures 351 and 352 communicate with gas inlet duct 328 and are positioned above the bottom of container body portion 322.

The humidifier container embodiment illustrated in FIGS. 11, 12 and 13 can be fabricated in the same manner as described hereinabove, i.e., utilizing a two-stage blowing process during which the gas inlet duct 228 and apertures 251 are formed first and then the container body portion 222. Thereafter chamber 224 defined by body portion 222 is filled with the desired humidifying liquid and the filled container is hermetically sealed.

Similar manufacturing steps are used to fabricate a container with the side diffuser portion shown in FIG. 14 using mold parts having the appropriate contours.

In use, the gas to be humidified enters chamber 224 from its side and through apertures 251 and the channels associated therewith. The entering gas stream is broken up into a plurality of gas bubbles, each having a lateral velocity component. As a result, the gas bubbles generated within the liquid contained in chamber 224 rise upwardly in an arcuate path and away from the container wall.

While the humidifier container embodying the present invention has been illustrated and described with reference to preferred embodiments, the present invention is not limited thereto. Alternatives, changes or modifications within the spirit and scope of this invention will become apparent to those skilled in the art upon reference to the foregoing specification and the drawings. Accordingly, such alternatives, changes and modifications are included as a part of the present invention.

We claim:
1. A sealed, unitary liquid container of a thermoplastic material and suitable for use with an inhalation therapy apparatus, comprising:
   a body portion defined by an upstanding, walled chamber having a bottom and a sidewall, constituting a reservoir for an aqueous liquid and containing a predetermined amount thereof;
   a gas inlet duct means unitary with the body portion, extending alongside the walled chamber, having an upper end portion situated above usable liquid level in said container and defining a sealed gas inlet, and having a lower end portion situated below said usable liquid level in said container;
   a gas diffuser means defined by the container sidewall and communicating with the walled chamber near but above the bottom thereof as well as with said gas inlet duct means; and
   a sealed humidified gas outlet means unitary with the container and communicating with the walled chamber above usable liquid level in said container;
   wherein the lower end portion of the gas inlet duct means includes a gas manifold means unitary with the container defining a plurality of spaced-apart channels, and said gas diffuser means is a plenum defined by the container sidewall.

2. The liquid container of claim 1 wherein a first portion of the liquid container sidewall adjacent the plenum defines a lip, and wherein a second portion of the liquid container sidewall is spaced above the plenum and defines a substantially vertically disposed wall portion offset from the lip by an amount sufficient to cause a stream of gas bubbles from the plenum to be spaced from the substantially vertically disposed wall portion.

3. The liquid container of claim 1 wherein said sealed gas inlet is provided with an unitary closure that is removable by twisting.

4. The liquid container of claim 1 wherein said sealed gas outlet is provided with unitary closure that is manually removable.

5. The liquid container of claim 1 wherein both the sealed gas inlet and the sealed gas outlet are provided with unitary closures that are manually removable.

6. The liquid container of claim 1 wherein said plenum is defined in part by a convex upper plenum surface adapted to dispense plural gas bubble streams from the plenum and wherein the upper plenum surface merges into a pair of opposed end portions each of which is disposed upwardly at a predetermined angle sufficient to cause gas bubbles in the plenum to form at least two separate rising gas bubble streams within liquid contained in the container.

7. The liquid container of claim 6 wherein each said end portion is disposed upwardly at an angle of about three to about five degrees.

8. The liquid container of claim 6 wherein the liquid container width and the plenum width are in a ratio in the range of about ten to about four.

9. The liquid container of claim 6 wherein the liquid container width and the plenum width are in a ratio of about seven.

* * * * *